March 23, 1948. R. B. COTTRELL ET AL 2,438,473
BRAKE ARRANGEMENT FOR RAILWAY DISC BRAKES
Filed June 7, 1945 4 Sheets-Sheet 1
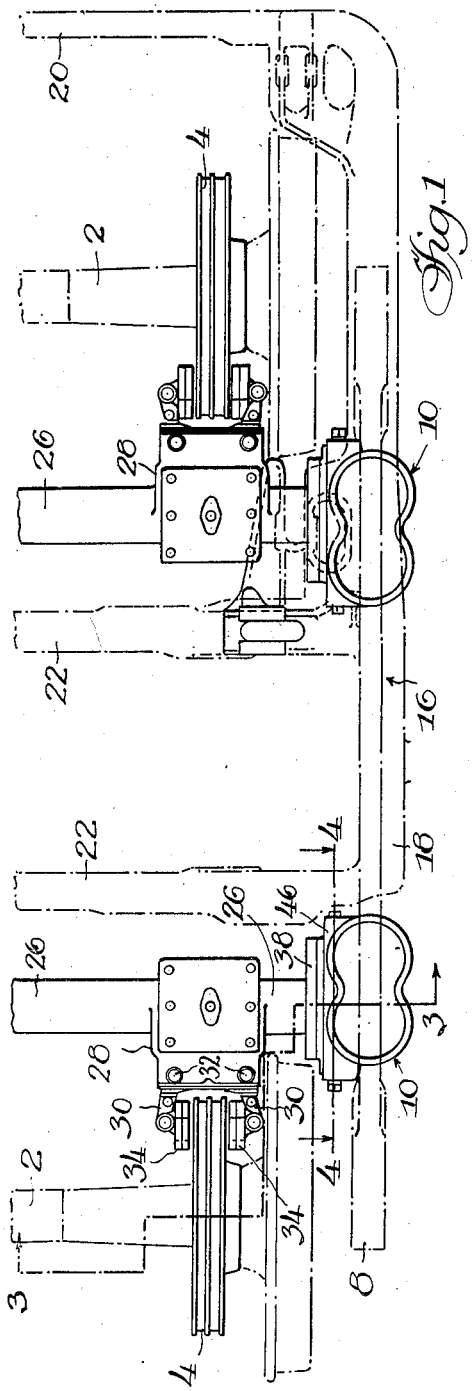
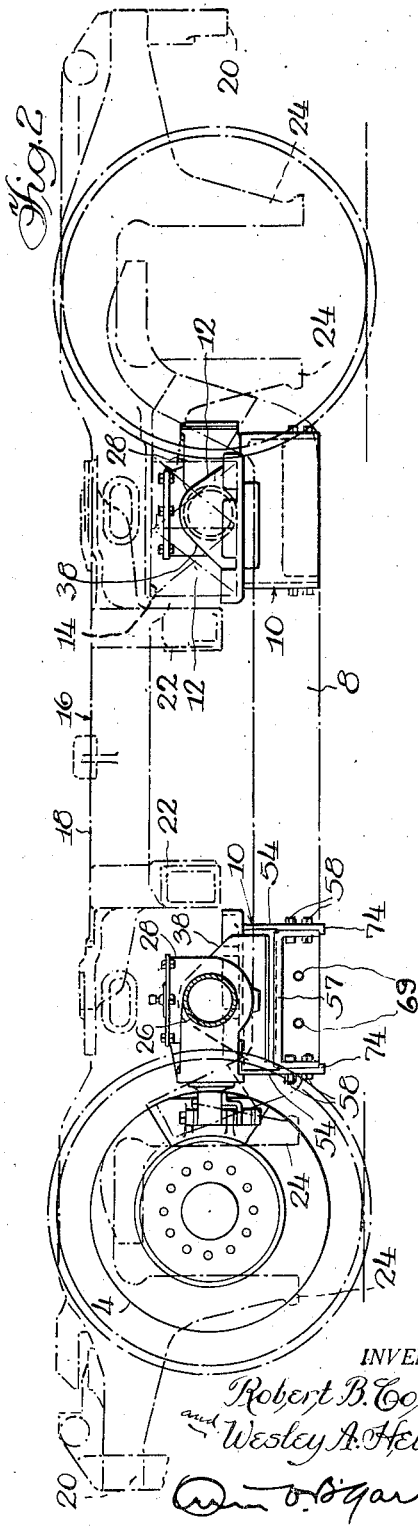
INVENTORS
Robert B. Cottrell
and Wesley A. Helsten

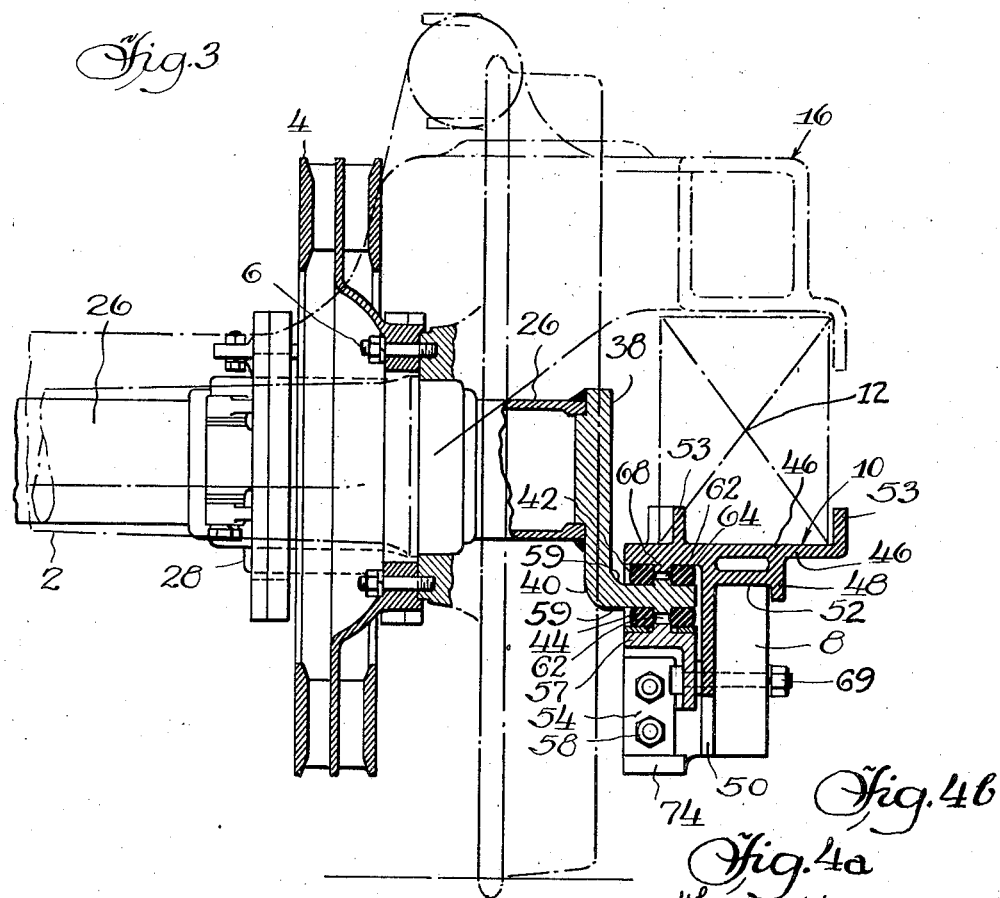
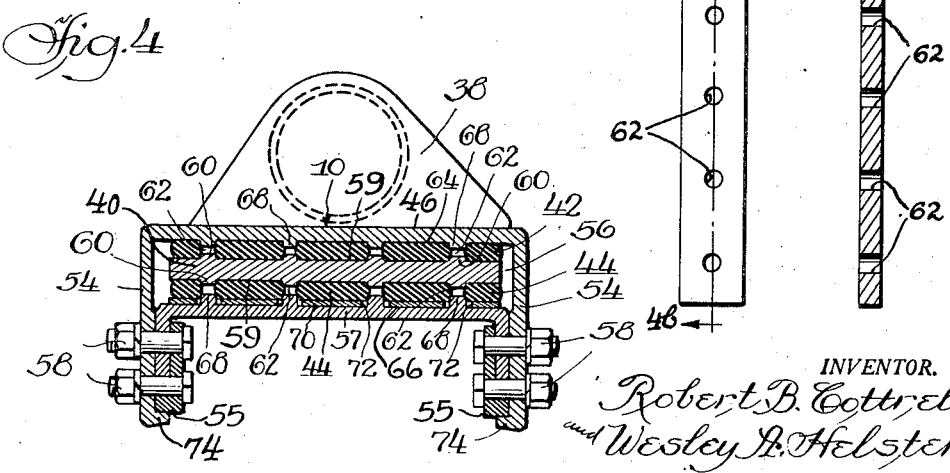

March 23, 1948. R. B. COTTRELL ET AL 2,438,473
BRAKE ARRANGEMENT FOR RAILWAY DISC BRAKES
Filed June 7, 1945 4 Sheets-Sheet 3
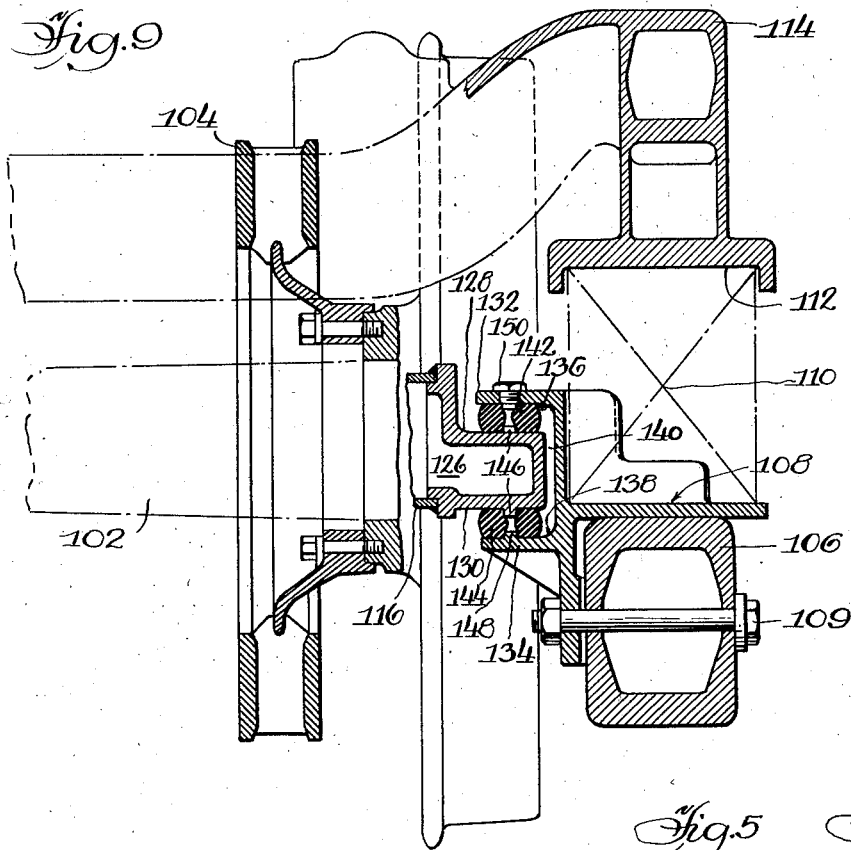
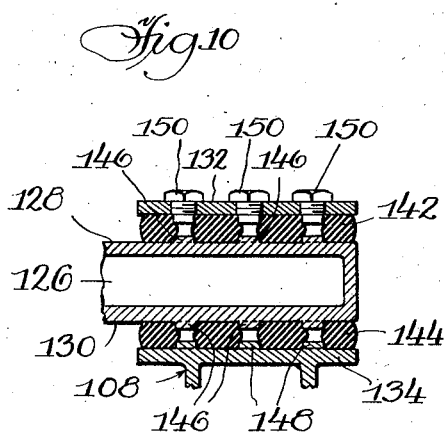
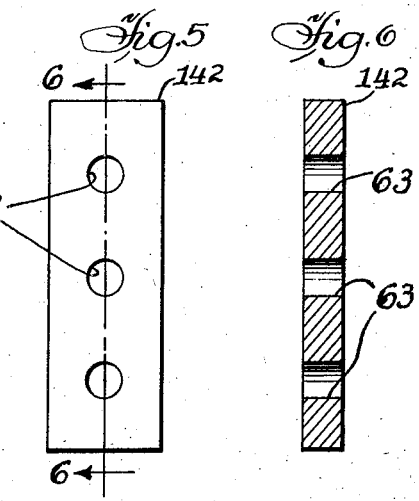
INVENTORS.
Robert B. Cottrell
and Wesley A. Helsten,
Wm. O. B. Garner Atty.

March 23, 1948.  R. B. COTTRELL ET AL  2,438,473
BRAKE ARRANGEMENT FOR RAILWAY DISC BRAKES
Filed June 7, 1945  4 Sheets-Sheet 4

INVENTORS
Robert B. Cottrell
and Wesley A. Helsten

Patented Mar. 23, 1948

2,438,473

UNITED STATES PATENT OFFICE 2,438,473

BRAKE ARRANGEMENT FOR RAILWAY DISC BRAKES

Robert B. Cottrell and Wesley A. Helsten, Chicago, Ill., assignors to American Steel Foundries, Chicago, Ill., a corporation of New Jersey Application June 7, 1945, Serial No. 598,084

20 Claims. (Cl. 188—59)

Our invention relates to rotor brake mechanism for railway car trucks, and especially passenger car trucks, wherein a brake frame, associated with each wheel and axle assembly and carrying clasp brake means for engagement with rotor brake discs carried on said assembly, is resiliently supported from the truck frame.

The general object of our invention is to provide novel support means for a brake frame at its point of connection to the truck frame.

A specific object of our invention is to provide novel means for resiliently supporting a brake frame from a truck frame wherein the brake frame is in the form of a beam extending transversely of the truck and having opposite end portions thereof resiliently supported from the truck frame, each end portion of said brake beam comprising top and bottom flat surfaces of substantial area with resilient pads bearing thereagainst and mounted in the illustrated embodiments of the invention in an adjacent equalizer-supported spring seat, each of said pads having spaced openings therein receiving projections on the associated brake beam end portion and seat to maintain said pads in a predetermined relationship with the same during distortion of said pads in shear upon longitudinal or lateral movement of said beam relative to the truck frame.

A further object of the invention is to provide novel support means for a brake frame from the truck frame with a simplified construction of the related connecting parts which may be economically manufactured and has long life in service.

Referring now to the drawings,

Figure 1 is a fragmentary top plan view of a railway passenger car truck embodying our invention, only one side of the truck being illustrated as it is symmetrical about its longitudinal center line, a portion of the truck frame being broken away in the left half of this figure to more clearly illustrate the structure thereneath.

Figure 2 is a side view of the structure shown in Figure 1, the right half of Figure 2 being a side elevation and the left half thereof being a sectional view taken in the longitudinal vertical plane bisecting the truck.

Figures 3 and 4 are sectional views taken respectively in the planes indicated by the lines 3—3 and 4—4 of Figure 1.

Figure 4a is a side elevation of one of the resilient pads supporting the brake frame as illustrated in Figures 1–4 inclusive, and Figure 4b is a section taken in the plane indicated by line 4b—4b of Figure 4a.

Figure 5 is a side elevation of one of the resilient pads supporting the brake frame as illustrated in Figures 7–10 inclusive, and Figure 6 is a section taken in the plane indicated by the line 6—6 of Figure 5.

Figure 7:
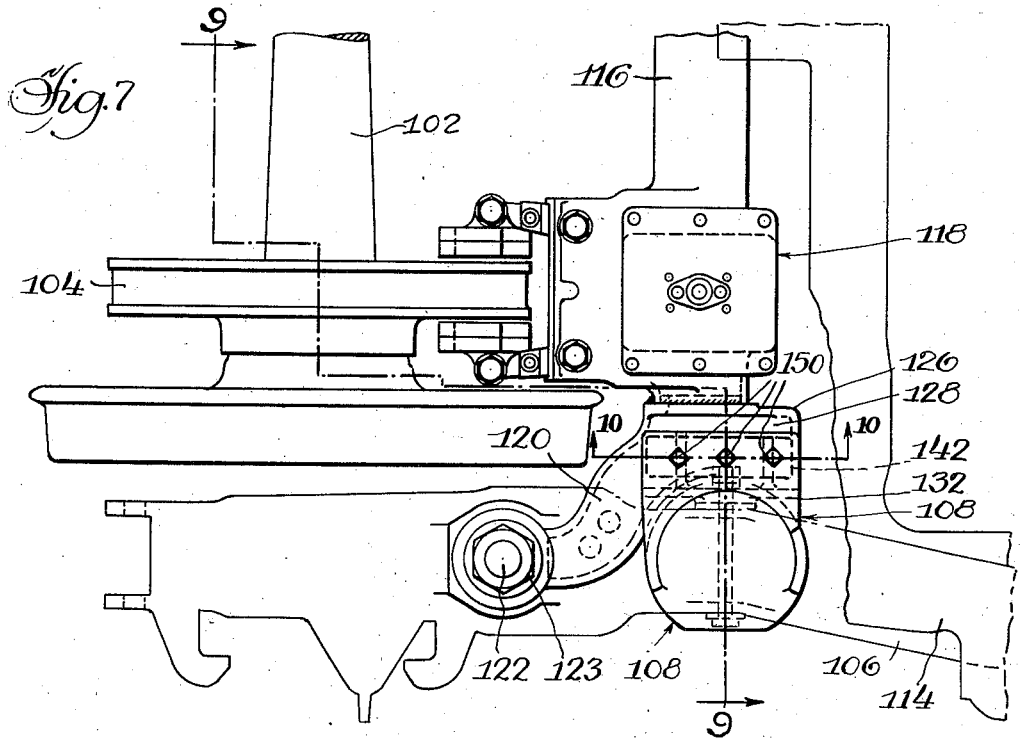

Figure 7 is a fragmentary top plan view of a railway passenger car truck embodying a modification of our invention, only one quarter of the truck being illustrated inasmuch as the structure associated with each wheel is identical, a portion of the truck frame being broken away to more clearly illustrate the structure thereneath.

Figure 8:
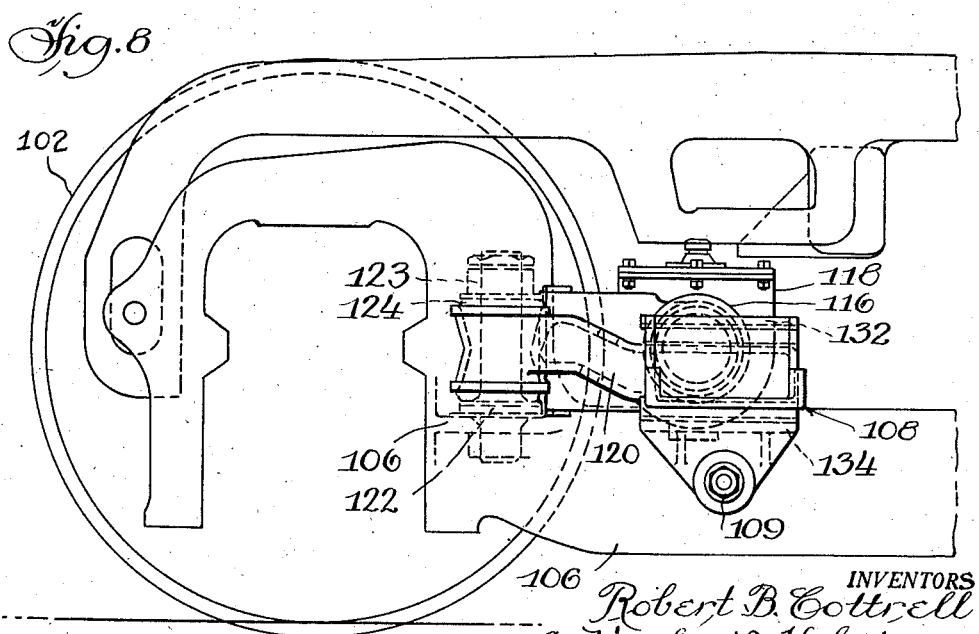

Figure 8 is a side view of the structure shown in Figure 7, and Figure 9 is a sectional view taken approximately in the planes indicated by the line 9—9 of Figure 7.

Figure 10 is a sectional view taken in the plane indicated by the line 10—10 of Figure 7.

Referring now to the embodiment of the invention illustrated in Figures 1–4b inclusive, the truck there shown is substantially identical with that illustrated and described in an application, Serial No. 512,110, filed November 29, 1943, now Patent Number 2,433,582, December 30, 1947, in the names of Carl E. Tack and Wesley A. Helsten, for Rotor brake, said truck comprising the spaced wheel and axle assemblies 2, 2 comprising the brake discs 4, 4 secured thereto as at 6, 6, the journal ends of said assemblies being received in conventional manner within journal boxes (not shown). Mounted on the journal boxes at each side of the truck is an equalizer 8 of conventional form, and supported from each equalizer 8 adjacent each end thereof is a composite spring seat member or casting, generally designated 10 and affording support for the springs 12, 12 diagrammatically illustrated in Figure 3 and in the right half of Figure 2, said springs being seated as at 14 against the truck frame 16 and affording resilient support therefor in the usual manner.

The truck frame 16 is of conventional form comprising a side rail 18 at each side thereof merging with an end rail 20 at each end of the truck and a pair of spaced transoms 22, 22 formed and arranged in the usual manner for support of the truck bolster (not shown) interposed therebetween. At each end thereof the side rail 18 is provided with the depending pedestal legs 24, 24 adapted for the reception of the associated journal box. A brake frame or beam 26 is supported adjacent each wheel and axle assembly 2, as hereinafter more fully described, said beam comprising adjacent each end thereof a cylinder housing 28 in which brake levers 30, 30 are fulcrumed as at 32, 32, said levers supporting brake heads 34, 34 having brake shoes for engagement with opposite sides of the adjacent brake disc or rotor 4.

As shown in Figure 3, each end of the beam 26 is provided with a plate-like member 38 of L-section, said member being secured to the beam 26 in any convenient manner such as by welding and having its horizontal leg 40 compressed between top and bottom resilient members 42 and 44 mounted on the adjacent spring seat member 10 as hereinafter described.

The spring seat member 10, as best shown in the sectional views of Figures 3 and 4, comprises the top web 46 and the spaced integral outboard and inboard depending webs 48 and 50, said depending webs embracing the adjacent portion of the equalizer 8 upon which the spring seat member is seated as at 52. The top web 46 is provided with an upstanding flange 53 affording convenient confining means for the springs 12, 12 which are seated on the web 46 and afford support for the truck frame 16 as above described. Integrally formed with the top web 46 and the inboard depending web 50 are the spaced walls 54, 54 defining a pocket 56 for the reception of the resilient members 42 and 44. Referring to Figures 4a and 4b, it will be seen that each resilient member is a rectangular resilient pad, and these pads, as shown in Figures 3 and 4, are compressed against the leg 40 of the member 38 by a clamping piece 57, which is secured to the end walls 54, 54 by means of the filler blocks 55, 55 and bolt and nut assemblies 58, 58. The leg 40 of the member 38 at each end of the beam 26 is provided with top and bottom generally substantially rectangular bearing surfaces 59, 59 for cooperation with the resilient members 42 and 44, said bearing surfaces being of considerably greater width than that of the beam 26 and being provided with spaced lugs 60, 60 projecting outwardly on opposite sides of said beam and being received within openings 62 in the pads 42 and 44, the surfaces 64 and 66 of the top web 46 and the clamping piece 57, respectively engaging the associated pad 42 or 44 and having lugs 68, 68 projecting therefrom into the openings in the associated pad. It may be noted from a consideration of Figures 3 and 4 that the lugs 60 on the leg 40 of the member 38 are spaced from the adjacent lugs 68, 68 on the top web 46 and the clamping piece 57 in the arrangement shown so that the brake beam is resiliently supported at all times by the pads 42 and 44, said pads resisting in shear relative movement between the beam 26 and the equalizer 8 laterally or longitudinally of the truck. It will be apparent that any tendency of the surfaces of the pads in engagement with the surfaces on the leg 40 of the member 38, the clamping piece 57 and the top web 46 to move relative thereto, during movement of the beam relative to the equalizers 8 longitudinally or laterally of the truck, will be prevented by said lugs. In the two-point support thus afforded, the brake frame from the equalizers, it may be noted that the pads 42 and 44 will absorb the torque transmitted to the truck structure. The spring seat member 10 is maintained in its proper position longitudinally of the equalizer 8 by means of the bolt and nut assemblies 69 extending through said equalizer and the inboard depending web 50 of the spring seat member as well as the clamping piece 57.

Referring now to Figure 4, it will be noted that the clamping piece 57 is provided with a plate 70 having openings 72 therein receiving the lugs 68 of said clamping piece and bearing against the pad 44 and the surface 66 of the clamping piece. This plate may be readily disengaged from the lugs 68 of the clamping piece and positioned on the lugs 68 of the web 46 to adjust the vertical height of the brake beam so that proper alignment between the brake shoes carried thereby and the rotors are maintained in the event wheel wear necessitates shimming of the equalizers at their points of support on the journal boxes to maintain coupler height.

Referring now to Figure 4, each end wall 54 of the spring seat member 10 is provided with an inturned flange 74 underlying the adjacent filler block 55 and portion of the clamping piece 57 to afford support therefor and to resist shearing stresses on the bolt and nut assemblies 58, 58.

It will be apparent from the foregoing that we have provided novel support means for the brake frame from the supporting equalizer-mounted spring seat which may be economically manufactured, is simple in construction, and, in service, is adapted to resist lateral and longitudinal movement between the brake frame and the truck frame besides performing its primary object of resiliently supporting the brake frame on the truck frame.

Referring now to the embodiment of the invention illustrated in Figures 5-10 inclusive, the truck construction there fragmentarily shown comprises the wheel and axle assemblies 102 comprising the brake disc 104, the journal ends of said assemblies being received in the conventional manner within journal boxes (not shown). Mounted on the journal box at each side of the truck is an equalizer 106 of conventional form, and supported from each equalizer 106 adjacent each end thereof is a spring seat member 108 secured thereto by a bolt and nut assembly 109, as shown in Figure 9, and affording support for the springs 110 diagrammatically illustrated in Figure 9, said springs being seated as at 112 against the truck frame 114 and affording resilient support therefor in the usual manner. The brake frame or beam 116, supported adjacent each wheel and axle assembly 102, is provided with clasp brake means generally designated 118, as previously described, and having engagement with the adjacent brake rotor 104. Each end of the beam 116 is provided with a torque arm 120 having an aperture receiving an upstanding pin 122 provided on the equalizer 106, said arm 120 being secured thereto by a nut 123 threaded on said pin, said pin having rubber bushings 124 in engagement with the torque arm 120 for resiliently mounting the torque arm on the equalizer.

It will be noted from a consideration of Figure 9 that the beam is provided with a hollow portion 126 adjacent each end thereof and formed integral with the associated torque arm 120, said portion 126 having top and bottom flat surfaces 128 and 130 substantially rectangular in form. The portion 126 is received within a jaw formed by the laterally extending walls 132 and 134 of the seat member 108, said walls 132 and 134 having flat surfaces 136 and 138, respectively, defining a pocket 140 for the reception of the resilient members 142 and 144. The members 142 and 144 comprise resilient rubber pads disposed on opposite sides of the portion 126 and bearing against the surfaces 128 and 130 of the same and the surfaces 136 and 138 of the spaced walls 132 and 134 defining the jaw on the spring seat member 108, as shown in Figures 9 and 10. The portion 126 is provided at each side thereof with aligned lugs 146 received within openings in the rubber pads 142 and 144, and the wall 134 of the jaw of the spring seat member 108 is also provided with lugs 148 received within the openings in the pad 144, the wall 132 of the spring seat member 106 being provided with bolts 150 threaded therein and projecting into the openings 63, 63 in the adjacent pad 142, said lugs 146 and 148 and said bolts serving a similar purpose as that described in the previous modification.

It will be apparent that by this arrangement above described the brake frame will be resiliently supported from the truck frame and the rubber pads 142 and 144 will be placed in shear during longitudinal and lateral movement of the brake frame relative to the truck frame with the torque arms 120 transmitting torque from the brake beam to the truck frame.

It is to be understood that we do not wish to be limited by the exact embodiments of the device shown which are merely by way of illustration and not limitation as various and other forms of the device will, of course, be apparent to those skilled in the art without departing from the spirit of the invention or the scope of the claims.

We claim:

1. In a brake arrangement for a railway car truck, a wheel and axle assembly comprising a braking surface, an equalizer supported from said assembly, a spring seat member on said equalizer comprising a top web, spaced inboard and outboard webs embracing said equalizer, springs on said top web, a truck frame supported from said springs, a brake support member having an end portion with substantially horizontal top and bottom bearing surfaces of generally rectangular form, a resilient pad compressed between said top surface and said top web, a clamping piece secured to said spring seat member and supporting a resilient pad compressed against said bottom surface, and friction means on said support member for cooperation with said braking surface, said bearing surfaces, said top web, and said clamping piece having projections extending within openings in the associated pads, said pads resiliently supporting said support member and yieldingly resisting relative longitudinal and lateral movement of said support member with respect to said equalizers and being designed to yieldingly resist braking torque between said support member and said equalizers.

2. In a railway car truck, spaced wheel and axle assemblies, equalizers supported from said assemblies at opposite sides of the truck, spring seat members mounted on each equalizer adjacent opposite ends thereof, springs mounted on said members, a truck frame supported from said springs, a brake beam extending transversely of said truck adjacent each assembly and having an L-section platelike member on each end thereof, spaced resilient pads mounted on oppositely disposed surfaces of each spring seat member and bearing against the top and bottom surfaces of the associated horizontal leg of said L-section member, projections on respective surfaces spaced from each other and received within openings in the associated pads, and friction means carried by said beams for cooperation with braking surfaces on said assemblies, said pads resiliently supporting said support member and yieldingly resisting relative longitudinal and lateral movement of said support member with respect to said equalizers and being designed to yieldingly resist braking torque between said support member and said equalizers.

3. In a brake arrangement for a railway car truck, spaced wheel and axle assemblies, equalizers supported therefrom, spring seat members on said equalizers, springs on said members, a frame member supported from said springs, a braking surface on each assembly, a brake support member adjacent each assembly comprising end portions each having substantially rectangular top and bottom bearing surfaces, resilient pads carried by each spring seat member and bearing against the top and bottom surfaces of the adjacent end portion for resiliently supporting the same, spaced lugs on said surfaces and said spring seat member projecting into said pads, and friction means carried by said support member for cooperation with said braking surface, said pads resiliently supporting said support member and yieldingly resisting relative longitudinal and lateral movement of said support member with respect to said equalizers and being designed to yieldingly resist braking torque between said support member and said equalizers.

4. In a brake arrangement for a railway car truck, a wheel and axle assembly, equalizers supported therefrom adjacent opposite ends thereof, spring seat members on respective equalizers, springs on said members, a truck frame supported from said springs, a brake beam extending transversely of said truck adjacent said assembly, vertically spaced resilient pads mounted on each spring seat member inboard the associated equalizer, said pads clamping therebetween the adjacent extremity of said beam and each having openings therein, spaced projections on each spring seat member and the adjacent extremity of said beam received within said openings, and friction means on said beam for cooperation with a braking surface on said assembly, said pads resiliently supporting said support member and yieldingly resisting relative longitudinal and lateral movement of said support member with respect to said equalizers and being designed to yieldingly resist braking torque between said support member and said equalizers.

5. In a brake arrangement for a railway car truck, spaced wheel and axle assemblies, equalizers supported therefrom, spring seat members on said equalizers, springs on said members, a frame member supported from said springs, a braking surface on each assembly, a brake support member adjacent each assembly comprising end portions each having substantially horizontal bearing surfaces, resilient pads carried by each spring seat member and bearing against the surfaces of the adjacent end portion for resiliently supporting the same, spaced vertical lugs projecting from said surfaces and said spring seat member and having engagement with said pads, said pads resiliently supporting said support member and yieldingly resisting relative longitudinal and lateral movement of said support member with respect to said equalizers and being designed to yieldingly resist braking torque between said support member and said equalizers.

6. In a brake arrangement for a railway car truck, a wheel and axle assembly, equalizers supported therefrom adjacent opposite ends thereof, a truck frame resiliently supported from said equalizers, a brake support member having a portion adjacent each equalizer provided with substantially horizontal top and bottom bearing surfaces, means carried by the inboard side of each equalizer resiliently supporting the adjacent portion of each member, each of said means comprising spaced members having resilient pads in engagement therewith and the adjacent surface of said portion, and projections on each of said spaced members and each of said surfaces received within openings in the associated pad, said pads resiliently supporting said support member and yieldingly resisting relative longitudinal and lateral movement of said support member with respect to said equalizers and being designed to yieldingly resist braking torque between said support member and said equalizers.

7. In a brake arrangement for a railway car truck comprising truck structure and supporting wheel and axle assemblies, a brake beam extending transversely of said truck adjacent each assembly, means for supporting each beam from said truck structure, said means comprising a pocket supported from the inboard side of said truck adjacent each end of said beam, a clamping member removably mounted within said pocket, spaced resilient pads in said pocket mounted respectively on a wall of said pocket and said member, said wall, member and end of said beam having spaced projections extending into said pads for interlocking said pads therewith, said pads resiliently supporting said support member and yieldingly resisting relative longitudinal and lateral movement of said support member with respect to said equalizers and being designed to yieldingly resist braking torque between said support member and said equalizers.

8. In a brake arrangement for a railway car truck, a wheel and axle assembly, equalizers supported therefrom adjacent opposite ends thereof, a truck frame resiliently supported from said equalizers, a brake support member having an end portion with substantially horizontal top and bottom bearing surfaces of generally rectangular form, a jaw on each equalizer receiving said end portion therein, a resilient pad compressed between each surface and said jaw, and spaced lugs projecting from said surfaces and said jaw and received within openings in said pads, said pads resiliently supporting said support member and yieldingly resisting relative longitudinal and lateral movement of said support member with respect to said equalizers and being designed to yieldingly resist braking torque between said support member and said equalizers.

9. In a brake arrangement for a railway car truck, a wheel and axle assembly, an equalizer supported from said assembly, a truck frame resiliently supported from said equalizer, vertically spaced members supported by said equalizer inboard thereof, a brake support element having a portion adjacent said equalizer and received between said spaced members, said portion and said members having oppositely disposed substantially horizontal bearing surfaces, a resilient pad compressed between each surface on said portion and a surface on the adjacent member, and interlocking means on said members and said portion in engagement with said pads and adapted to prevent movement of said pads relative to said surfaces during relative longitudinal or lateral movement of said element with respect to said equalizer.

10. In a brake arrangement for a railway car truck, a wheel and axle assembly, equalizers supported therefrom adjacent opposite ends thereof, a truck frame resiliently supported from said equalizers, a brake beam extending transversely of said truck adjacent said assembly, vertically spaced resilient pads disposed on substantially horizontal webs supported from said equalizers inboard thereof, said pads clamping therebetween an adjacent portion of said beam, and spaced projections on said beam portion and said webs extending into said pads for interlocking said pads therewith, said pads resiliently supporting said support member and yieldingly resisting relative longitudinal and lateral movement of said support member with respect to said equalizers and being designed to yieldingly resist braking torque between said support member and said equalizers.

11. In a brake arrangement for a railway car truck, a wheel and axle assembly, equalizers supported therefrom adjacent opposite ends thereof, a truck frame resiliently supported from said equalizers, a brake support member having a portion adjacent each equalizer provided with substantially horizontal top and bottom bearing surfaces, and means carried by the inboard side of each equalizer resiliently supporting the adjacent portion of said member, each of said means comprising spaced members receiving therebetween said portion, and resilient pads compressed between each of said spaced members and the adjacent bearing surface, said spaced members and said surfaces having oppositely disposed spaced projections received within openings in said pads.

12. In a brake arrangement for a railway car truck, a wheel and axle assembly, equalizers supported therefrom adjacent opposite ends thereof, a truck frame resiliently supported from said equalizers, a brake support member having an end portion with substantially horizontal top and bottom bearing surfaces of generally rectangular form, a jaw on each equalizer receiving said end portion therein, a resilient pad compressed between each surface and said jaw, spaced lugs projecting from said surfaces and said jaw and received within openings in said pads, and a torque arm extending outwardly of each end portion and resiliently mounted on said equalizer.

13. In a brake arrangement for a railway car truck comprising truck structure and supporting wheel and axle assemblies, a brake beam extending transversely of said truck, said brake beam comprising a torque arm at each end thereof resiliently mounted on the adjacent side of said truck and substantially horizontal bearing surfaces on said beam adjacent each torque arm, a pocket in each inboard side of said truck having vertically disposed resilient means mounted on spaced walls thereof and bearing against said surfaces, and means on said walls and said surfaces interlocked with said resilient means intermediate the ends thereof.

14. In a brake arrangement for a railway car truck comprising truck structure and supporting wheel and axle assemblies, a brake beam extending transversely of said truck and supported from the sides of said truck, a pocket in each inboard side of said truck comprising top and bottom walls receiving the adjacent portion of said beam therebetween, a resilient pad compressed between said top wall and the adjacent side of said beam portion, another resilient pad compressed between said bottom wall and the adjacent side of said beam portion, and means on said walls and said beam portion interlocked with said pads intermediate the ends thereof.

15. In a brake arrangement for a railway car truck comprising truck structure and supporting wheel and axle assemblies, a brake beam extending transversely of said truck, said brake beam comprising a torque arm at each end thereof resiliently mounted on the adjacent side of said truck and substantially horizontal bearing surfaces on said beam adjacent each torque arm, a pocket in each inboard side of said truck having vertically disposed resilient means mounted on spaced walls thereof and bearing against said surfaces, said walls and said surfaces having projections extending within said resilient means.

16. In a brake arrangement for a railway car truck, a wheel and axle assembly, equalizers supported adjacent opposite ends thereof, a car truck resiliently supported from said equalizers, a brake frame extending between said equalizers and having a portion adjacent each equalizer provided with spaced substantially horizontal surfaces, a jaw supported from each equalizer at the inboard side thereof and receiving the adjacent portion of said frame, resilient pads compressed between said jaw and said surfaces, and means carried by said jaw and said surfaces for interlocking said pads therewith.

17. In a brake arrangement for a railway car truck comprising truck structure and supporting wheel and axle assemblies, a brake beam extending transversely of said truck adjacent each assembly, a support for each beam comprising a connection between each end thereof and means associated with said truck structure, said connection comprising vertically spaced members supported from said truck inboard thereof adjacent each end, spaced resilient pads mounted on said members and clamping therebetween the adjacent end, and means on said members and said end in interlocking engagement with said pads.

18. In a brake arrangement for a railway car truck comprising truck structure and supporting wheel and axle assemblies, a brake beam extending transversely of said truck and supported from the inboard sides of said truck, each of said supports comprising a pocket in each of said truck sides and receiving an adjacent portion of said beam, each of said pockets comprising vertically spaced walls, resilient means mounted on said walls and clamping said beam portion therebetween, and projections on said beam portion and said walls received within openings in said resilient means.

19. In a brake arrangement for a railway car truck comprising truck structure and supporting wheel and axle assemblies, a brake beam extending transversely of said truck and supported from the inboard sides of said truck, each of said supports comprising vertically spaced members carried by said truck and receiving an adjacent portion of said beam therebetween, resilient means mounted on said members and clamping said beam portion therebetween, and projections on said members and said beam portion extending within aligned openings in said resilient means.

20. In a brake arrangement for a railway car truck comprising truck structure and supporting wheel and axle assemblies, a brake beam extending transversely of said truck and supported from the inboard sides of said truck, each of said supports comprising vertically spaced members carried by said truck and receiving an adjacent portion of said beam therebetween, resilient means mounted on said members and clamping said beam portions therebetween, projections on said members and said beam portions extending within said resilient means, and a torque arm at each end of said beam resiliently mounted on the adjacent side of said truck.

ROBERT B. COTTRELL.
WESLEY A. HELSTEN.

REFERENCES CITED

The following references are of record in the file of this patent:

UNITED STATES PATENTS

| Number | Name | Date |
|---|---|---|
| 1,872,767 | Lee | Aug. 23, 1932 |
| 1,911,330 | Symington | May 30, 1933 |
| 1,911,331 | Symington | May 30, 1933 |
| 2,100,065 | Buckwalter | Nov. 23, 1937 |
| 2,253,268 | Eksergian et al. | Aug. 19, 1941 |
| 2,276,337 | Pflager | Mar. 17, 1942 |
| 2,334,024 | Nystrom et al. | Nov. 9, 1943 |
| 2,365,460 | Eksergian et al. | Dec. 19, 1944 |
| 2,384,459 | Eksergian | Sept. 11, 1945 |